Oct. 14, 1924.

A. J. HALL ET AL 1,511,329

CONTROL APPARATUS

Filed July 15, 1919   6 Sheets-Sheet 5

WITNESSES:
H.J. Shelhamer
D.C. Davis

INVENTORS
Arthur J. Hall &
Paul L. Mardis
BY
ATTORNEY

Oct. 14, 1924.

A. J. HALL ET AL

1,511,329

CONTROL APPARATUS

Filed July 15, 1919    6 Sheets-Sheet 6

WITNESSES:
H.J.Shelhamer
D.C.Davis

INVENTORS
Arthur J. Hall &
Paul L. Mardis
BY
Wesley G. Carr
ATTORNEY

Patented Oct. 14, 1924.

1,511,329

UNITED STATES PATENT OFFICE.

ARTHUR J. HALL, OF PITTSBURGH, AND PAUL L. MARDIS, OF SWISSVALE, PENNSYLVANIA, ASSIGNORS TO WESTINGHOUSE ELECTRIC & MANUFACTURING COMPANY, A CORPORATION OF PENNSYLVANIA.

CONTROL APPARATUS.

Application filed July 15, 1919. Serial No. 311,025.

*To all whom it may concern:*

Be it known that we, ARTHUR J. HALL, a subject of the King of Great Britain, and a resident of Pittsburgh, in the county of Allegheny and State of Pennsylvania, and PAUL L. MARDIS, a citizen of the United States, and a resident of Swissvale, in the county of Allegheny and State of Pennsylvania, have invented a new and useful Improvement in Control Apparatus, of which the following is a specification.

Our invention relates to control apparatus for governing electric railway motors and the like and has special relation to master controllers of the drum type.

One object of our invention is to provide a master controller having a plurality of novel drum structures and actuating means therefor, for effecting various functions in the control system to be governed.

Another object of our invention is to provide a master controller having four operating handles for governing different operations of the electric railway motors, or the like, to be governed, the several handles being so arranged and located that a relatively compact and convenient layout is produced.

A further object of our invention is to provide novel interlocking means between the various control drum structures for preventing improper relative operation thereof.

Another object of our invention is to provide a novel type of operating handle for effecting an additional form of interlocking.

Other objects of our invention will become evident from the following detailed description taken in conjunction with the accompanying drawings, wherein—

Fig. 12 to Fig. 17, inclusive, are detail views of parts of the mechanical interlocking device that is employed in our controller.

Referring to the drawings, the structure here shown comprises a master controller having a base or back-plate 1; a curved front cover or casing 2; and a top cover or plate 3. A plurality of drum-type controllers 4, 5, 6 and 7, which will be respectively designated as the speed drum, motor combination drum, regeneration drum and reverse drum, are located within the controller casings to be respectively operated by handles or levers 8, 9, 10 and 11. A gear-wheel transmission mechanism 12 is interposed between the speed drum 4 and its operating handle 8, while mechanical interlocking means 13 are associated with the various drum structures in a manner to be hereinafter set forth in detail. A pushbutton device 14 is located just below the top plate 3 in the vicinity of the speed drum handle 8.

The back-plate or base 1 comprises a suitable casting for the purpose of supporting the various bearing members for the drum structures, as hereinafter more fully set forth, and is further provided with a plurality of hinge devices 20 for permitting the front casing 2 to be swung to one side for purposes of inspection or repair. Normally, a suitable latch 21 serves to attach the casing 2 to the base 1.

To suitably brace the controller box in front, a plurality of lugs 15 are provided upon the top and the bottom cover-plates, and an angle-iron 16 extends between, and is secured by bolts 17 to the lugs 15.

The speed drum 4 comprises a cylinder 22 of suitable insulating material, the upper edge of which is bolted to a chambered metallic cylinder or disk 23 for the purpose of transmitting movement of the speed drum handle 8 through the gear-wheel mechanism 12 to the drum 4, and for also co-operating with the interlocking means 13, as subsequently set forth in detail.

A plurality of suitable contact segments or strips 24 are secured to the insulating cylinder 22 to be engaged in the desired sequence by a plurality of control fingers 26, which are mounted upon a suitable finger-base or block 27 that is bolted to the back-plate 1.

A shaft 25 is pinned within a downwardly extending hub of the metallic cylinder 23 and extends through the drum 4 for the purpose of providing a suitable bearing structure (not shown) in the lower part of the controller. A second shaft or stem 28 is suitably pinned within an upwardly extending hub of the metallic cylinder 23, the upper end of the shaft 28 constituting a pinion 30 that meshes with an internal toothed surface of an annular sector or gear-wheel 31. A suitable bearing block 29 serves to position the pinion shaft 28 and is itself bolted to the back-plate 1.

The sector or gear-wheel 31 is rigidly mounted upon an offset shaft 32 that extends parallel to the speed drum shaft 25 and through a suitable boss 33 in the top cover member 3 to be engaged by the operating handle 8. The sector 31 is further provided with a plurality of upwardly extending lugs 34 and 35 to which a star-wheel or notched strip 36 is bolted for the purpose of accentuating the operating positions of the speed drum 4. To accomplish this purpose, a pawl 37, pivoted upon a spindle 38 that is secured to the top cover 3, is adapted to engage the successive notches of the star-wheel 36 through the action of a biasing spring 39, the stationary end of which is secured to a lug 40 depending from the interior surface of the top cover 3.

The motor combination drum 5 comprises a cylinder 41 of insulating material upon which suitable contact segments 42 are mounted for engaging a plurality of control fingers 43 mounted upon a finger-base 44. A shaft 45 concentrically extends through both the motor combination drum 5 and the alined regeneration drum 6 to a point outside of the top cover 3, where the motor combination drum handle 9 is attached to the shaft. A pin 46 serves to secure the top metallic supporting disk 47, which is bolted to the insulating cylinder 41, to the operating shaft 45. The lower supporting disk 48 of the regeneration drum 6, on the other hand, is loosely mounted on the shaft 45. In this way, the motor combination drum 5 may be operated by the shaft 45, while the regeneration drum 6 is not so actuated.

The regeneration drum 6 comprises a suitable insulating cylinder 51, which is bolted to the lower end of a sleeve 52 that loosely encloses the shaft 45 and extends upwardly through a bearing member 53 supported by a block or pedestal 54 that is bolted to the back-plate 1. The sleeve 52 further extends through an opening in the top cover 3 having a protruding rim or lip 55 upon which a collar or ring 56, that is fastened to the sleeve 52, rests. The regeneration drum handle 10 is provided with a depending tongue 57 that engages a suitable slot in the upper end of the sleeve 52, whereby movement of the sleeve and, therefore, of the regeneration drum 6 may be effected. The movement of the regeneration drum is limited in the one and the other direction by means of a projection or lug 58 upon the bearing block 54 that is adapted to be engaged by projecting ears 59 and 60 of the sleeve 52 when the proper position of the regeneration drum has been reached.

The insulating cylinder 51 has mounted upon it the necessary contact segments 61 for engaging a plurality of control fingers 62, mounted upon the finger-base 44, to close the desired controlling circuits in either position of the drum.

The sleeve 52 is provided with a preferably integral cam member 63 for the purpose of engaging the interlocking means 13 to prevent improper relative movement of the regeneration drum and the other drum structures, as hereinafter set forth in detail.

The reverse drum 7 comprises an insulating cylinder 70, carrying suitable contact segments 71 for selectively engaging a plurality of control fingers 72 that are mounted upon a finger base 72$^a$, whereby the desired forward or reverse connections of the governed motors may be effected. The insulating cylinder 70 is bolted to a sleeve 73, which is rigidly fastened by pins 75 to an operating shaft 78. A notched disk or cam 74, preferably integral with the sleeve 73, is adapted for suitable engagement with the interlocking means 13, as subsequently described in detail. A suitable bearing block 77 encloses the shaft 78 just above the sleeve 73 and is bolted to the back-plate 1. The shaft 78 extends upwardly through the top cover 3 and the operating lever or handle 11 is attached thereto.

Figure 6:
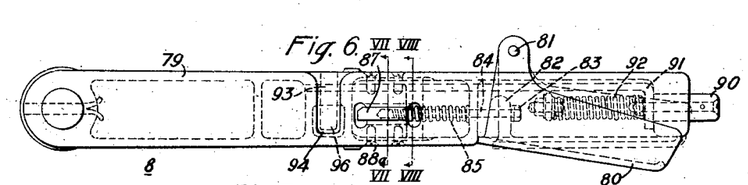
Fig. 6 to Fig. 11, inclusive, are detail views of two of such operating handles.
Figures 6, 15, 17:
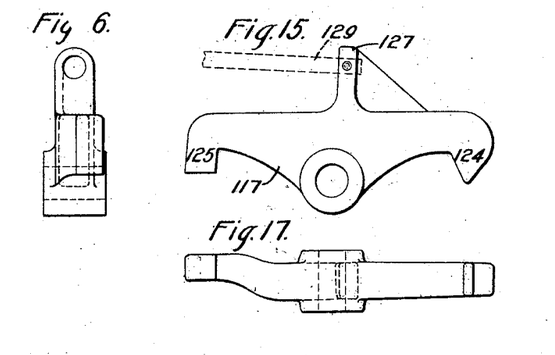

The speed drum handle 8 (see Fig. 6) comprises a body casting 79 and a thumb-lever 80 which is pivotally mounted at 81 upon suitable projections or lugs on the casting 79. In the normal solid-line position of the thumb-lever 80, an internal lug 82 engages the head 83 of a relatively long bolt 84, of small diameter, which pierces the internal lug 82. A helical spring 85 surrounds one portion of the bolt 84 and is adapted to act between an internal web 86 of the body casting 79 and a slidable member or latch 87. A guide-plate 88 is secured between the side walls of the body casting 79 by means of suitable screws 88$^a$, for example, for the purpose of permitting the latch 87 to freely reciprocate in accordance with the movements of the thumb-lever 80.

Figure 7:
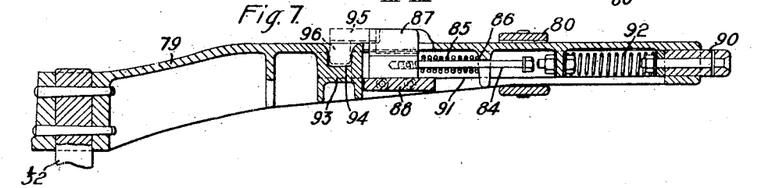
Figure 8:
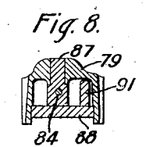
Figure 9:
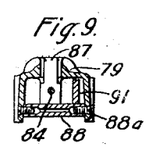

A push-button 90 is inserted in the free end of the body casting 79 and is bolted to a bent strap member 91 which extends within the body casting 79 substantially parallel to one wall thereof. A helical spring 92 normally biases the push-button 90 and the strap 91 to the illustrated outer position. The strap 91 is adapted, upon the operation of the push-button 90, to slide along a shallow groove 93, which is cut in the lower wall of a transverse slot or recess 94. This recess is open at the top and one side of the body casting 79. The purpose of the slot 94 may be set forth as follows. A curved guide-strip 95 (see Fig. 5), having a plurality of notches 95a corresponding to various operating positions of the speed drum 4, is located just above the intermediate portion of the body casting 79 corresponding to the transverse slot 94, and a lug 96 is secured to the under side of the guide-strip 95, as indicated in dotted lines in Figs. 5 and 7. The guide-strip 95 is bolted to suitable pillars or standards 99 which are, in turn, bolted to the top cover-plate 3.

The operation of the speed drum handle 8 may be described as follows. For normal forward movement from the illustrated notch 97 in the guide-plate 95, corresponding to "off" position of the speed drum, the thumb-lever 80 is employed, while the push-button 90 is not manipulated in any way. By pressing the thumb-lever 80 to enclose the corresponding portion of the body casting 79, as indicated by the proper dotted lines in Fig. 6, the bolt 84 is actuated by the internal lug 82 toward the right, from the illustrated position, to effect corresponding sliding movement of the latch 87 and compression of the associated spring 85. In this way, the latch 87 is withdrawn from the notch 97 in the guide-strip 95 to permit forward movement of the speed drum handle 8 to any desired notch 95a. It will be understood that the speed drum handle 8 may be operated from notch to notch or allowed to remain in a position corresponding to any running position of the drum by suitable release and pressure of the thumb-lever 80.

The push-button 90 is employed during the return movement of the speed drum handle 8 to prevent movement thereof beyond a predetermined notch, in this case, notch 98, without requiring any further attention or thought upon the part of the train operator. In actual practice, this return movement of the speed drum handle is employed for effecting transition of the governed motors and it is, therefore, extremely desirable to prevent open-circuiting the motors and thus temporarily losing the driving torque, as would occur if the speed drum handle 8 were allowed to return to the "off" position. However, by merely depressing the push-button 90, as the handle 8 is grasped to effect return movement of the handle, the handle may be moved backwardly by pressure upon the thumb-lever 80, as previously described. By reason of the depression of the push-button 90, the strap member 91 is actuated to occupy the inner or left-hand end of the groove 93 and thus bar the opening to the slot 94 in the upper portion of the body casting 79. Consequently, as soon as the speed handle 8 reaches a position corresponding to the first operating notch 98, the lug 96 on the lower side of the guide-strip 95 is struck by the strap 91 and the handle 8 is thus prevented from moving beyond the notch in question so long as pressure is maintained upon the push-button 90. In this way, a quick return movement with a stop at the proper position may be made without requiring any attention on the part of the train operator other than initially depressing the push-button 90.

Although the illustrated position and proportion of parts are such that the backward movement of the operating handle 8 is stopped in the first operative position, corresponding to notch 98, it will be understood that the structure in question may readily be adapted to arrest backward or forward movement at any desired position. For example, by cutting the slot 94 entirely across the top face of the body casting 79, a lug corresponding to 96 might then be secured at any predetermined point beneath the guide-strip 95. The slot 94 would permit the lug 96 to freely slide through during forward movement, for example, of the operating handle; but upon depression of the push-button 90, and consequent blocking of the slot 94 by the strap 91, backward movement would be arrested at the desired point, corresponding to the engagement of the strap 91 with the lug 96.

Figure 5:
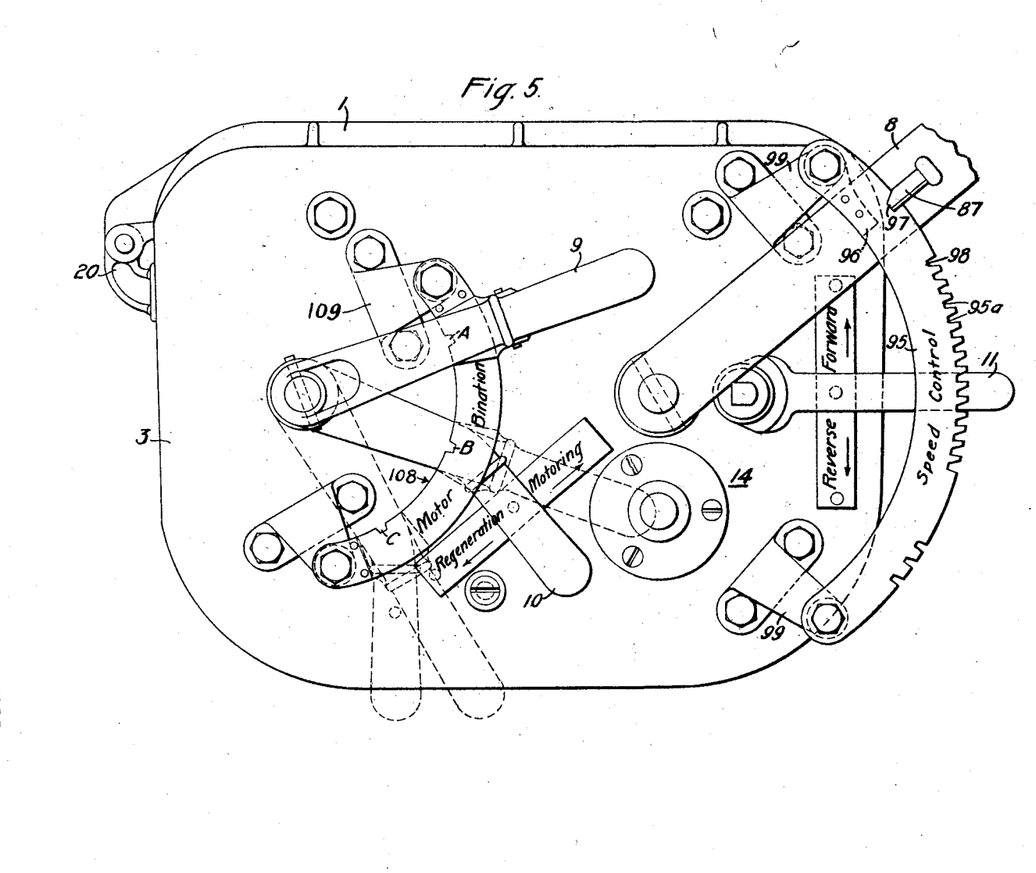
Fig. 5 is a plan view of the controller and the various operating handles therefor.
Figure 10:
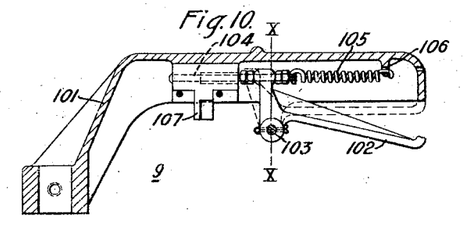
Figure 11:
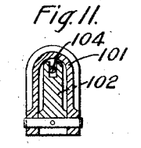
Figure 12:
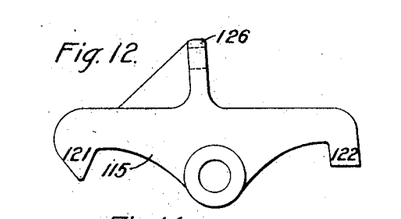
Figure 13:
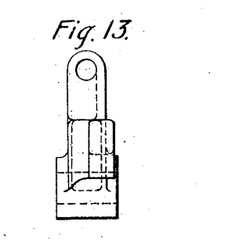
Figure 14:
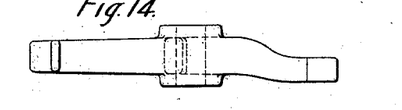

The motor combination drum handle 9, shown in section in Fig. 10 and Fig. 11, comprises an angular body member 101, one end of which is pinned to the shaft 45 of the motor combination drum 5. A thumb-lever 102 is pivoted upon a projection 103 on the lower side of the handle 9 and is secured within the handle to a longitudinally extending pin 104, the thumb-lever 102 and the pin 104 being biased to the illustrated positions through the action of a helical spring 105, the stationary end of which is secured to a depending lug 106 within the handle 9. A tongue or lug 107 extends beneath the lower surface of the body member 101 and is slidably movable by the action of the thumb-lever 102 to engage the successive notches in the inner or small-diameter edge of a curved guide-strip 108. As indicated in Fig. 5, three notches, marked A, B and C, respectively, are cut in the inner edge of the strip 108 to be engaged by the tongue 107, such notches respectively corresponding to three different motor combinations or operating speeds. The ends of the strip 108 are bolted to standards or pillars 109 that are themselves bolted to the top cover-plate 3.

It should be noted that a relatively compact and convenient arrangement of handles is provided in our invention. The motor combination handle 9 is located above the regeneration handle 10 at one side of the controller, while the handles for the speed drum and the reverse drum are located on different levels at the other side of the controller.

The interlocking means 13 comprises a lever or bar 115 that is pivotally mounted at an intermediate point 116, while a second laterally displaced lever 117 is mounted at an intermediate pivotal point 118. The hollow pivots of the two interlocking levers are loosely secured to the bearing block 29 by means of suitable bolts and nuts 119 and 120, respectively.

Figures 1, 2:
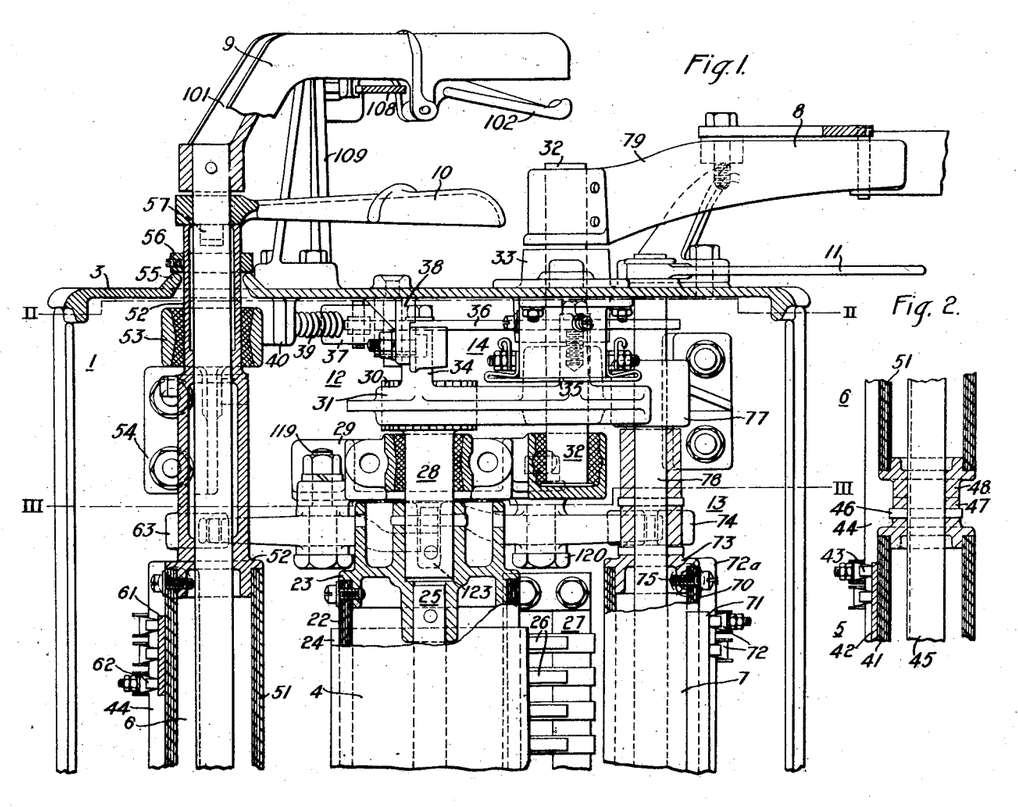
Figure 1 is a view, partially in elevation and partially in longitudinal section, of the upper portion of a master controller constructed in accordance with the present invention.
Fig. 2 is a view, in longitudinal section, of another portion of the master controller.
Figure 3:
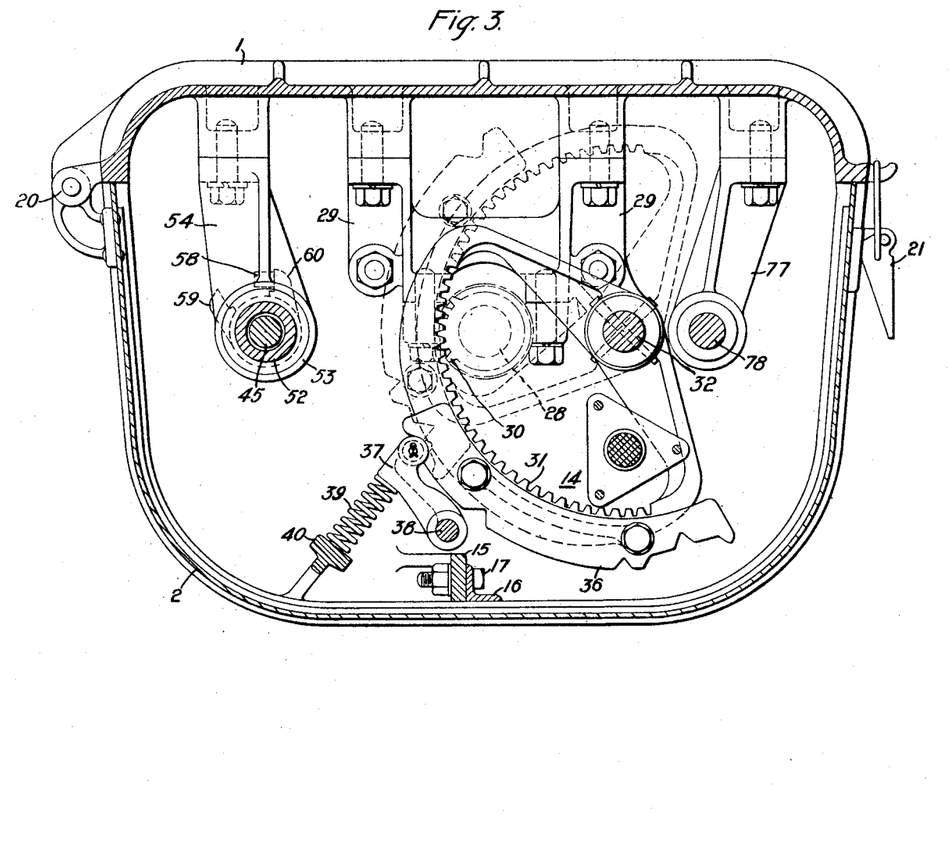
Fig. 3 and Fig. 4 are views, in transverse section, taken along the lines II—II and III—III, respectively, of Fig. 1.
Figure 4:
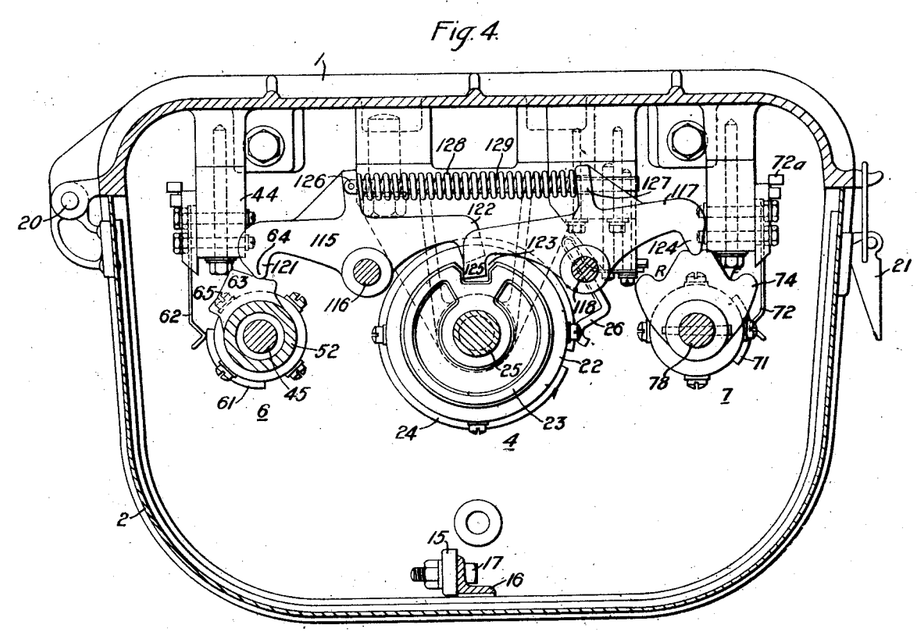

The outer or illustrated left-hand tip 121 of the interlocking lever 115 is normally adapted to engage suitable shallow notches 64 and 65 located on opposite sides of the cam 63, which is integrally attached to the sleeve 52 of the regeneration drum 6. The inner tip or end 122 of the lever 115 is fashioned to engage a notch 123 in the metallic cylinder 23 of the speed drum 4 under predetermined operating conditions, but the tip 122 normally is free from the cylinder 23, as illustrated in Fig. 4.

The other interlocking lever 117 has its outer tip 124 adapted to engage either the illustrated intermediate neutral notch of the reverse drum 7, this notch corresponding to "off" position of the drum, or the one or the other of the notches marked F and R, corresponding to forward and reverse operation, respectively, of the reverse drum. The inner end or tip 125 of the interlocking lever 117 normally rests within the notch 123 in the metallic cylinder 23 of the speed drum. The interlocking levers 115 and 117 are respectively provided with lugs 126 and 127 on the sides remote from the control drums, and a spiral spring 128, surrounding a guide rod 129, acts between the lugs 126 and 127 to bias the interlocking levers toward the illustrated positions; that is, the lever 115 is biased in a counterclockwise direction and the lever 117 in a clockwise direction.

The various functions of the interlocking means 13 may be set forth as follows:

In the illustrated position of the interlocking lever 117, corresponding to the "off" positions of both the speed drum 4 and the reverse drum 7, it is impossible to move the speed handle 8 from the "off" position by reason of the tip 125 resting within the slot 123 in the supporting disk 23. However, as soon as the reverse drum 7 is actuated to either its forward or its reverse position, denoted by F and R in Fig. 4, the tip 124 of the interlocking lever 117 is rotatably moved by the action of the spring 128 into the corresponding relatively deep notch in the cam 74, whereby the other tip 125 of the interlocking lever is withdrawn from the notch 123 and assumes a position just clearing the outer vertical wall of the metallic disk or ring 23. Consequently, movement of the speed disk drum 4 is permitted as desired. However, once such movement of the speed drum 4 has been made, it is then impossible to actuate the reverse drum 7 back to its neutral or "off" position, since the tip 125 strikes the ring 23 to prevent the tip 124 from riding over the surface of the cam 74 into the relatively shallow intermediate notch corresponding to neutral position of the reverse drum 7.

Referring to the other interlocking lever 115, it will be noted that, whenever the regeneration drum 6 occupies either the illustrated motoring position, wherein interlocking tip 121 engages notch 64, or the regenerative position, wherein the notch 65 would be substituted for the notch 64, movement of the speed drum 4 is permitted, since the interlocking tip 122 will clear the vertical wall of the metallic disk or ring 23. However, if, for any reason, the regeneration drum 6 should become stuck in some position intermediate the notches 64 and 65, then the interlocking tip 122 is depressed to a point within the notch 123 in the ring 23 to thus prevent movement of the speed drum 4 until the regeneration drum 6 occupies one or the other of its operating notches. On the other hand, whenever the speed drum 4 occupies an operative position, it is impossible to move the regeneration drum 6, since the interlocking tip 122 engages the vertical wall of the ring 123 to prevent the cam 63 from sliding past the other interlocking tip 121.

In this way, four necessary interlocking operations are ensured, to prevent improper relative operation of the illustrated drums, although a single spring member 128 acts between the two interlocking levers. A compact and relatively inexpensive interlocking means over the prior-art apparatus, comprising two separate sets of interlocking levers, springs and supports upon the back-plate 1, is thus provided.

The push-button 14 forms no part of our present invention, but is fully set forth and claimed in a copending application of E. E. Rose and P. L. Mardis, Serial No. 344,564, filed Dec. 13, 1919, and assigned to the Westinghouse Electric & Manufacturing Company.

We do not wish to be restricted to the specific structural details or arrangement of parts herein set forth as various modifications thereof may be made without departing from the spirit and scope of our invention. We desire, therefore, that only such limitations shall be imposed as are indicated in the appended claims.

We claim as our invention:

1. The combination with a controller body of insulating material, of a metallic supporting disk secured to one end thereof, a gear-wheel attached to said disk, an offset shaft and operating handle therefor, a sector gear-wheel secured to said shaft and internally meshing with the first-named gear-wheel, a second controller body, means for interlocking said second controller with said supporting disk, a notched member directly secured to said sector gear-wheel only, and a position-accentuating pawl co-operating with said notched member.

2. The combination with a plurality of vertically alined hollow drums of insulating material and having abutting metallic end-portions, of a shaft extending through both drums and secured to the metallic end-portion of the lower drum, a sleeve enclosing said shaft and attached to the other drum, and remotely located handles respectively secured to said shaft and said sleeve.

3. In a controller, the combination with four parallel-extending operating shafts, of two drums enclosing one shaft and respectively secured thereto and movable with respect thereto, drums secured to two of the other shafts, means for operatively connecting the fourth shaft to one of said other shafts, operating handles for said two drums located one above the other at one side of the controller, and operating handles for the fourth shaft and the remaining drum located at the other side of the controller on different levels from the first-named handles.

In testimony whereof, we have hereunto subscribed our names this 8th day of July, 1919.

ARTHUR J. HALL.
PAUL L. MARDIS.